United States Patent [19]

Nanyoshi et al.

[11] Patent Number: 4,800,860

[45] Date of Patent: Jan. 31, 1989

[54] FUEL INJECTION CONTROL SYSTEM FOR INTERNAL COMBUSTION ENGINE WITH PRECISELY ENGINE LOAD DEPENDENT FUEL INJECTION AMOUNT ADJUSTMENT FEATURE

[75] Inventors: Yasutoshi Nanyoshi; Katsunori Oshiage, both of Kanagawa, Japan

[73] Assignee: Nissan Motor Company Limited, Yokohama, Japan

[21] Appl. No.: 143,087

[22] Filed: Jan. 12, 1988

[30] Foreign Application Priority Data

Jan. 14, 1987 [JP] Japan .................................. 62-7772

[51] Int. Cl.$^4$ .............................................. F02B 3/00
[52] U.S. Cl. .................... 123/492; 123/493
[58] Field of Search .............. 123/492, 480, 493, 478, 123/486

[56] References Cited

U.S. PATENT DOCUMENTS

| | | | |
|---|---|---|---|
| 4,527,529 | 7/1985 | Suzuki et al. | 123/492 |
| 4,543,937 | 10/1985 | Amano et al. | 123/492 |
| 4,562,817 | 1/1986 | Ito | 123/492 |
| 4,607,603 | 8/1986 | Kobayashi eet al. | 123/492 |
| 4,640,254 | 2/1987 | Ninomiya | 123/492 |
| 4,648,371 | 3/1987 | Kaneta | 123/492 |
| 4,656,988 | 4/1987 | Fukube et al. | 123/492 |
| 4,671,241 | 6/1987 | Yamato | 123/492 |
| 4,711,200 | 12/1987 | Kinoshita | 123/492 |

FOREIGN PATENT DOCUMENTS

| | | |
|---|---|---|
| 59-29733 | 2/1984 | Japan . |
| 59-211731 | 11/1984 | Japan . |
| 60-195347 | 10/1985 | Japan . |
| 60-233352 | 11/1985 | Japan . |
| 60-233353 | 11/1985 | Japan . |
| 61-76143 | 5/1986 | Japan . |

Primary Examiner—Raymond A. Nelli
Attorney, Agent, or Firm—Pennie & Edmonds

[57] ABSTRACT

A fuel injection control system performs fuel injection for each engine cylinder at mutually different timings in each engine revolution cycle. First and former fuel injection is take place at a timing well advanced in view of a timing of opening of an intake valve of the corresponding engine cylinder to inject full amount of fuel derived on the basis of an engine load and engine speed. Second fuel injection is performed at a timing close to or within the intake valve open period for injecting an amount for compensating fuel amount to be increased depending upon increase of the engine load. In addition, acceleration enrichment upon engine acceleration demand is taken place by adjusting the fuel injection amount for second fuel injection.

26 Claims, 7 Drawing Sheets

FUEL INJECTION CONTROL SYSTEM FOR INTERNAL COMBUSTION ENGINE WITH PRECISELY ENGINE LOAD DEPENDENT FUEL INJECTION AMOUNT ADJUSTMENT FEATURE

BACKGROUND OF THE INVENTION

1. Field of the Invention

The present invention relates generally to a fuel injection control system for an internal combustion engine, such as an automotive internal combustion engine. More specifically, the invention relates to a fuel injection control system which can precisely control the fuel metering amount depending upon variation of an engine load. Further particularly, the invention is directed to an improvement in and relating to a so-called sequential fuel injection system which is designed for injecting fuel for each engine cylinder at before and/or during piston induction stroke and thus is known for precise engine load dependency in adjustment of the fuel metering amount.

2. Description of the Background Art

Recently, higher fuel economy, higher engine response, higher engine performance and achievement of anti-polution are required for an automotive internal combustion engine. In response to such demand for the automotive engine, various control systems for the automotive engine and improvements thereof have been developed. For example, the Japanese patent first (unexamined) publications (Tokkai) Nos. Showa 60-195347, Showa 60-233352, Showa 60-233353, Showa 59-211731 and Showa 59-29733 have been proposed for precise fuel injection control for the automotive internal combustion engines.

In the proposed fuel injection control systems, fuel injection start timing and fuel injection amount are derived on the basis of an engine revolution speed and and an engine load condition. Fuel enrichment by increasing fuel metering amount is performed during engine warm-up condition, during engine accelerating condition and so forth. The fuel injection start timing is adjusted so that the injected fuel may form air/fuel mixture with intake air to be introduced into the engine combustion chamber during induction stroke. Consequently, during acceleration enrighment, the fuel injection start timing is advanced so that the increased amount of fuel can be introduced into the combustion chamber during the engine induction stroke.

Generally, the fuel injection start timing is set in synchronism with the engine revolution cycle. The fuel injection to be performed in synchronism with the engine revolution cycle will be hereafter referred to as "synchroneous injection". In addition, during acceleration enrichment, additional fuel injection can be performed irrespective of the engine revolution cycle for increasing fuel delivery amount. Such fuel injection which is not synchroneous to the engine revolution cycle will be hereafter referred to as "asynchroneous injection". In the most of the fuel injection control, asynchroneous injection is taken place in response to occurrence of the acceleration enrichment demand which is caused by increasing of an open angle of a throttle valve and/or increasing of an intake air flow rate (engine load).

The sequntial fuel injection system is known by good response characteristics to variation of the engine load since the fuel injection amount can be determined utilizing most recent engine driving parameters, such as engine speed, engine load and so forth. In view of precise engine load dependent fuel delivery amount control, it is preferable to determined the fuel injection amount and fuel injection start timing as late as possible. On the other hand, in order to form uniform mixture rate of air/fuel mixture which is essential to obtain good frame propagation characteristics during combustion, it is essential to sufficiently atomize the injected fuel. In order to achieve satisfactory atomization of the injected fuel, it is preferable to set the fuel injection timing sufficiently before staring of open of an intake valve which timing is the beginning of the induction stroke. These two requirements about the fuel injection timing conflict to each other.

Therefore, in the prior proposed fuel injection control systems, it was difficult or even impossible to full satisfy both requirements. Therefore, the prior proposed fuel injection systems could not optimize the engine response to variation of the engine load.

In order to solve such difficulty in the prior proposed sequential fuel injection controls, the Japanese utility model first publication (Jikkai) Showa No. 61-76143 proposes an improvement for the sequential fuel injection by performing fuel injection twice in each combustion cycle. Namely, in this proposal, first fuel injection is performed at a timing sufficiently advanced from the beginning of the engine induction stroke for better fuel atomization characteristics and second fuel injection is performed at a timing delayed as late as possible for compensating fuel amount to be delivered in the engine cylinder relative to engine load variation.

This may substantially improves fuel delivery characteristics and significantly improves engine response to variation of the engine load.

This prior proposed system essentially divides the necessary fuel injection amount for the aforementioned first and second fuel injection timings so that total amount of the fuel injected at both of the first and second fuel injection timings may corresponds to the required fuel amount. However, when the substantial change in the engine load occurs after setting of the fuel injection amount for the first injection, which may require acceleration enrichment, only half amount of fuel for acceleration enrichment may be increased for the second fuel injection. In addition, at the initial stage of engine acceleration, an air flow rate measuring the intake air flow rate delays in detection of the actually introduced air. Therefore, an air flow rate indicative signal to be used at the initial stage engine acceleration, will indicate smaller engine load indicative value than that actually introduced. Therefore, at the initial stage of acceleration, the air/fuel mixture to be supplied to the engine cylinder becomes lean. In the worst case, such lean mixture may leads mis-firing for degrading engine acceleration characteristics.

SUMMARY OF THE INVENTION

In view of the aforementioned drawbacks in the prior proposed fuel injection controls, it is a primary object of the present invention to provide a fuel injection control system for improving engine acceleration characteristics by better responsibility of acceleration enrichment operation to variation of the engine load.

Another object of the invention is to provide a fuel injection control system which performs "dual injection" for injecting fuel twice in each engine combustion cycle in such a manner than the fuel amount to be injected during the dual injection may satisfy a demand for acceleration enrichment.

A further object of the invention is to provide a sequential fuel injection control system which can determine the finally supplied total amount of the fuel during one combustion cycle at the possible latest timing for precision of derivation of the required fuel amount in view of the most recent engine driving parameter.

In order to accomplish the aforementioned and other objects, a fuel injection control system, according to the present invention, performs fuel injection for each engine cylinder at mutually different timings in each engine revolution cycle. First and former fuel injection is take place at a timing well advanced in view of a timing of opening of an intake valve of the corresponding engine cylinder to inject full amount of fuel derived on the basis of an engine load and engine speed. Second fuel injection is performed at a timing close to or within the intake valve open period for injecting an amount for compensating fuel amount to be increased depending upon increase of the engine load. In addition, acceleration enrichment upon engine acceleration demand is taken place by adjusting the fuel injection amount for second fuel injection.

According to one aspect of the invention, a fuel injection control system for an internal combustion engine comprises a plurality of fuel injection valves for injecting fuel to respectively engine cylinders, a first sensor means for monitoring engine load to produce a first sensor signal indicative thereof, a second sensor means for monitoring crank shaft angular position for producing a second sensor signal, a third means for monitoring engine speed to produce an engine speed indicative data, and a control unit for controlling operation of each of the fuel injection valves to perform controlled amount of fuel injection at first and second injection timings in one engine revolution cycle, the first injection timing being set at advanced timing to that of the second injection timing, the control unit performing two cycles of data processing operations at first derivation timing for deriving first fuel injection pulse width for fuel injection at the first injection timing, based in the first sensor signal value and the engine speed indicative data obtained at the first derivation timing and at a second derivation timing for deriving second fuel injection pulse width for fuel injection at the second derivation timing, which second fuel injection pulse width is variable depending upon variation of engine load between the first and second derivation timings for compensating fuel amount required by increase of the engine load during the period between the first and second derivation timings.

According to another aspect of the invention, a fuel injection control system for an internal combustion engine comprises a plurality of fuel injection valves for injecting fuel to respectively engine cylinders, a first sensor means for monitoring engine load to produce a first sensor signal indicative thereof, a second sensor means for monitoring crank shaft angular position for producing a second sensor signal, a third means for monitoring engine speed to produce an engine speed indicative data, a fourth means for monitoring variation of the engine load to detect engine acceleration demand for producing an acceleration demand indicative data, and a control unit for controlling operation of each of the fuel injection valves to perform controlled amount of fuel injection at first and second injection timings in one engine revolution cycle, the first injection timing being set at advanced timing to that of the second injection timing, the control unit performing two cycles of data processing operations at first derivation timing for deriving first fuel injection pulse width for fuel injection at the first injection timing, based in the first sensor signal value and the engine speed indicative data obtained at the first derivation timing and at a second derivation timing for deriving second fuel injection pulse width for fuel injection at the second derivation timing, which second fuel injection pulse width is variable depending upon variation of engine load between the first and second derivation timings for compensating fuel amount required by increase of the engine load during the period between the first and second derivation timings, and the control unit being responsive to the acceleration demand indicative data for deriving an acceleration enrichment fuel injection pulse width at the second derivation timing in place of the second fuel injection pulse width.

The control unit preferably maintains the acceleration enrichment fuel injection pulse width for a given number of occurences of second fuel injection.

The fuel injection control system may fourth means monitors throttle valve angular position for determining a throttle angle variation rate greater than a given value for producing the acceleration demand indicative data. The control unit determines the first and second injection timings and the first and second derivation timings on the basis of the second sensor signal and in synchronism with engine revolution cycle. The control unit derives fuel injection amount required for one engine cycle based on the first sensor signal value and the engine speed indicative data for setting the first fuel injection pulse width corresponding to twice of the fuel injection amount and derives a fuel compensating amount based on the engine load variation between the first and second derivation timings for setting the second fuel injection pulse width corresponding to twice of the fuel compensating amount.

The control unit derives fuel injection amount at the second derivation timing, compares the fuel injection amount derived at the second fuel derivation timing with the fuel injection amount derived at the first derivation timing for obtaining a difference which serves as the fuel compensating amount. The control unit set the first fuel injection timing for one engine cylinder to overlap with second fuel injection timing of another engine cylinder. The control unit further derives the first fuel injection pulse width for one engine cylinder at the first derivation timing and the second fuel injection pulse for the one of engine cylinder at the second derivation timing which overlaps with the first derivation timing for deriving the first fuel injection pulse width for another engine cylinder.

DESCRIPTION OF THE PREFERRED EMBODIMENT

Figure 1:
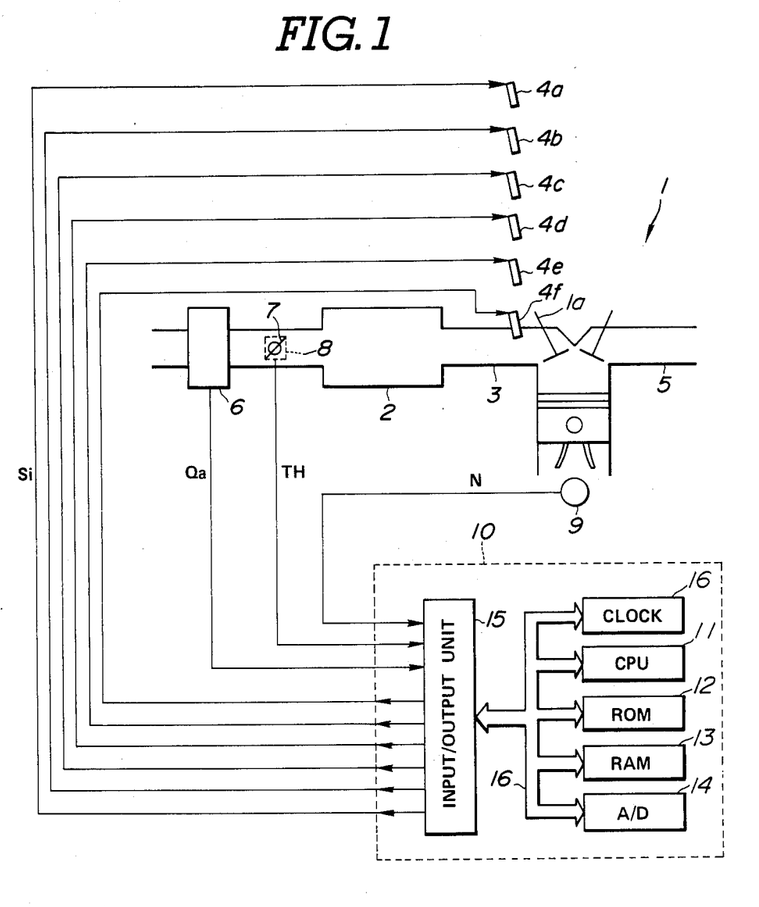
FIG. 1 is a schematic and diagramatic illustration of the preferred embodiment of a fuel injection control system according to the present invention.
Figure 2:
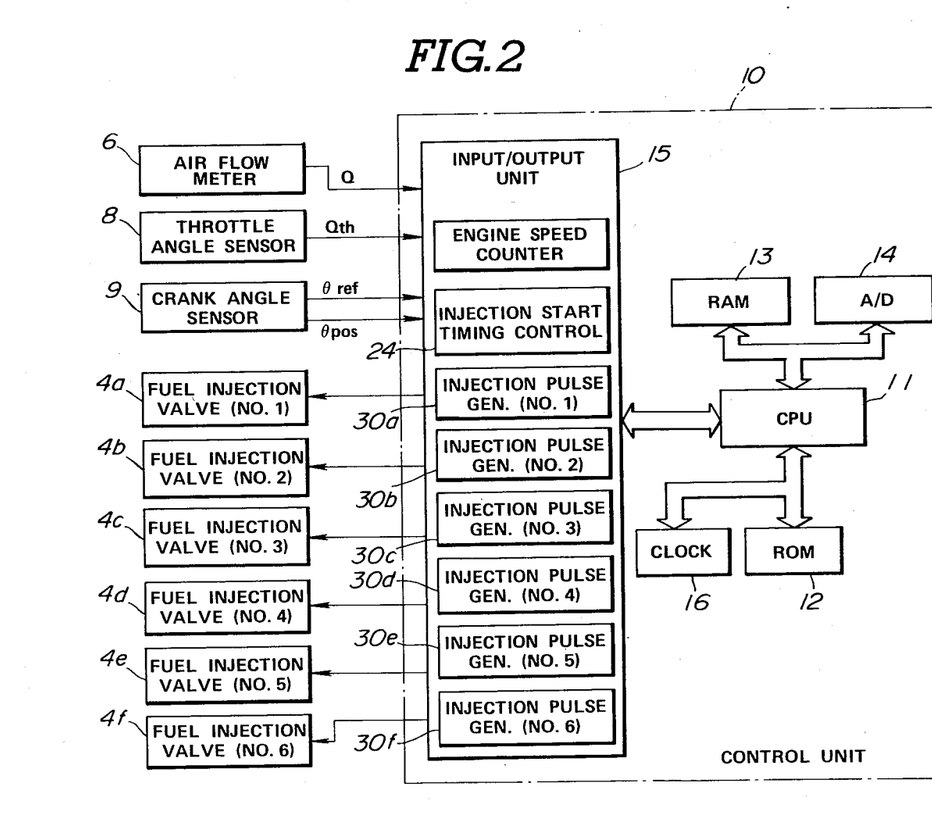
FIG. 2 is a block diagram of a control unit and a peripheral components thereof in the preferred embodiment of the fuel injection control system of FIG. 1.

Referring now to the drawings, particularly to FIGS. 1 and 2, the preferred embodiment of a fuel injection control system according to the present invention, is directed for so-called sequential injection type fuel injection internal combustion engine. Such type of fuel injection internal combustion engine has a plurality of fuel injection valves 4a, 4b, 4c, 4d, 4e and 4f. As will be appreciated herefrom, the shown embodiment is designed for injecting fuel for 6-cylinder internal combustion engine. Each of the fuel injection valves 4a, 4b, 4c, 4d, 4e and 4f are provided for injecting fuel into corresponding one of branch air passage in an intake manifold 3 which is connected to an induction passage through which the intake air is introduced. Fuel injected through one of the fuel injection valves 4a, 4b, 4c, 4d, 4e and 4f into the corresponding branch passage forms an air/fuel mixture and introduced into an engine combustion chamber defined within an internal combustion engine 1 for combustion, via an intake port which is openably closed by means of an intake valve 1a. An exhaust gas generated through combustion of the air/fuel mixture within the combustion chamber, is exhausted through an exhaust passage 5 which includes a catalytic converter for removing polutant in the exhaust gas and purifying the exhaust gas.

An air flow meter 6 is provided within the air induction passage for monitoring an intake air flow rate Q. As is well known, the intake air flow rate, as monitored by the air flow meter 6, represents an engine load condition. Therefore, the air flow meter 6 produces an engine load indicative air flow rate signal having a value variable depending upon the monitored air flow rate. A throttle valve 7 is provided within a throttle chamber in the air induction system and associated with an accelerator pedal to vary the open angle thereof depending upon magnitude of depression of the accelerator pedal. Variation of the throttle valve varies path area for the intake air and whereby changes the air flow rate through the induction passage. The angular position of the throttle valve 7 is monitored by means of a throttle angle sensor 8. The throttle angle sensor 8 monitors an angular position of the throttle valve 7 and produces a throttle angle signal having a value variable depending upon the throttle valve angular position.

A crank angle sensor 9 is provided for monitoring the engine revolution cycle by monitoring the angular position of a crank shaft (not shown). The crank angle sensor 9 may be provided in the vicinity of the crank shaft for monitoring the angular position directly. In the alternative, the crank angle sensor 9 may be housed within a distributor (not shown) in a spark ignition system for monitoring the crank shaft angular position by monitoring angular position of a rotor in the distributor which rotates in synchronism with engine revolution. The crank angle sensor 9 is designed to produce a crank position signal $\theta_{pos}$ at every given angle, e.g. 2° of the crank shaft angular displacement. The crank angle sensor 9 also produces a crank reference signal $\theta_{ref}$ at every predetermined angular positions, e.g. 70° before top-dead-center (BTDC) of each engine cylinder.

One of the crank position signal $\theta_{pos}$ and the crank reference signal $\theta_{ref}$ also serves for deriving an engine revolution speed (hereafter 'engine speed') N. In case that the crank position signal $\theta_{pos}$ is used for deriving the engine speed, an engine speed counter (not shown) may be provided in a control unit 10 for counting the crank position signal within a predetermined period, or in the alternative, for measuring elapsed time over occurence of predetermined number of crank position signals. On the other hand, in case that the crank reference signal $\theta_{ref}$ is used for deriving the engine speed N, the elapsed time between occurences of the crank reference signal and by deriving an inverse number of the measured elapsed time.

In addition to the sensors set forth above, a starter switch, an engine idling detector switch, an engine coolant temperature sensor, an oxygen sensor and so forth may be provided in the preferred embodiment of the fuel injection control system, as additional fuel injection control parameters.

The air flow meter 6, the throttle angle sensor 8 and the crank angle sensor 9 are connected to the control unit 10. The control unit 10 employed in the shown embodiment, is a microprocessor-based system including CPU 11, ROM 12, RAM 13, an analog-to-digital (A/D) converter 14 and an input and output unit 15. These circuit components of the control unit 10 are connected to each other via a common bus line 16. In the shown circuit construction, the A/D converter 14 converts the air flow rate signal and the throttle angle signal in analog form into digital signals.

CPU 11 performs fuel injection control operation according to fuel injection control program stored in ROM 12. Namely, CPU 11 reads data from the sensors and transfers data between RAM 13 for processing the data according to the fuel injection program. CPU 11 outputs resultant of the data processing to the input/output unit 15.

The input/output unit 15 have a plurality of input ports and output ports. The input ports are connected to the air flow meter 6, the throttle angle sensor 8 and the crank angle sensor 9 to receive therefrom the sensor signals. On the other hand, the output ports are connected to actuators respectively associated with the fuel injection valves 4a, 4b, 4c, 4d, 4e and 4f for controlling fuel injecting operation.

In the preferred circuit construction, at least a part of memory in RAM 13 may be a non-volatile memory so that data recorded therein will never erased by turning off of primary power supply.

The preferred embodiment of the fuel injection control system, as set forth above, generally performs fuel injection for injecting a controlled amount of fuel for one of engine cylinders approaching induction stroke, in synchronism with the engine operation cycle. Furthermore, in the shown embodiment, the fuel injection is performed twice in each injection timing. Namely, primary injection is performed at relatively advanced timing relative to induction top-dead-center (TDC) of the corresponding engine cylinder. On the other hand, an auxiliary injection is performed at relatively retarded timing relative to induction TDC of the corresponding engine cylinder.

Figure 3:
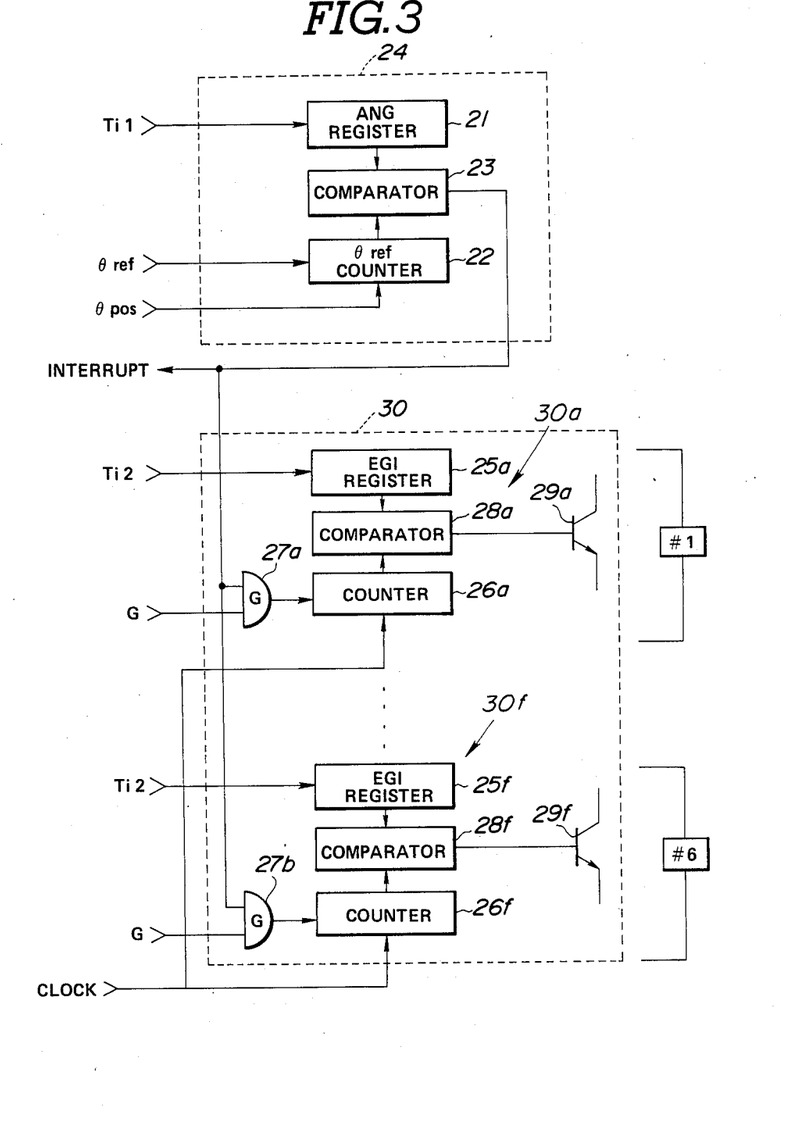
FIG. 3 is a block diagram showing the detail of an input/output unit in the control unit of FIG. 3.

FIG. 3 shows detailed construction of the relevant section of the input/output unit 15. The input/output unit 15 has a fuel injection start timing control section 24. The fuel injection start timing control section 24 has an angle (ANG) register 21, to which a fuel injection start timing derived by CPU during process of fuel injection control data, e.g., the air flow rate, throttle angle position, the engine speed and so forth. The fuel injection start timing control section 24 also has a crank position signal counter 22. The crank position signal counter 22 is designed to count up the crank position signals $\theta_{pos}$ and to be reset in response to the crank reference signal $\theta_{ref}$. A comparator 23 is also provided in the fuel injection start timing control section 24. The comparator 23 compares the fuel injection start timing indicative value set in the ANG register 21 and the crank position signal counter value in the counter 22. The comparator 23 outputs HIGH level comparator signal when the crank position signal counter value becomes the same as that of the fuel injection start timing indicative value. The HIGH level comparator signal of the comparator 23 is fed to a fuel injection pulse output section 30.

The fuel injection pulse output section 30 has a plurality of fuel injection pulse generators 30a, 30b, 30c, 30d, 30e and 30f, each of which corresponds one of fuel injection valves 4a, 4b, 4c, 4d, 4e and 4f. Each fuel injection pulse generator 30a, 30b, 30c, 30d, 30e and 30f has identical circuit construction to each other. Therefore, the following discussion will be concentrated for the fuel injection pulse generator 30a. The circuit constructions and operations thereof of the fuel injection pulse generators 30b, 30c, 30d, 30e and 30f will not be discussed in detail and simply identify the corresponding components with the reference numerals common to that of the fuel injection pulse generator 30a, with subscripts same as that identifying the fuel injection pulse generators.

The fuel injection pulse generator 30a comprises a fuel injection (EGI) register 25a, a clock counter 26a, an AND gate 27a, a comparator 28a and a power transistor 29a. A fuel injection pulse width data which is determined through data processing during execution of fuel injection control program to be discussed later, is set in the EGI register 25a. One input of the AND gate 27a is connected to the output of the comparator 23 to receive the comparator signal. To the other input of the AND gate 27a, a gate signal G which identifies the fuel injection valve 4a, 4b, 4c, 4d, 4e and 4f to perform fuel injection, is input. Namely, the gate signal G is produced in synchronism with the engine revolution cycle. Therefore, only one of the AND gate 27a, 27b, 27c, 27d, 27e and 27f is responsive to the HIGH level comparator signal to generate HIGH level gate signal.

The output of the AND gate 25a is connected to the clock counter 26a to feed the gate signal. The clock counter 26a is responsive to the leading edge of the gate signal of the AND gate 25a to be reset. On the other hand, the clock counter 26a is connected to a clock generator 16 in the control unit 10 to receive therefrom a clock pulse. The clock counter 26a counts up the clock pulse as triggered by the HIGH level gate signal. At the same time, the comparator 28a is triggered in response to resetting of the clock counter 26a to output HIGH level comparator signal to the base electrode of the power transistor 29a. The power transistor 29a is thus turned ON to open the fuel injection valve 4a to perform furl injection for No. 1 engine cylinder.

When the counter value of the clock counter 26a reaches the fuel injection pulse width value set in the EGI register 25a, the comparator signal of the comparator 28a turns into LOW level to turn OFF the power transistor 29a. By turning OFF of the power transistor 29a, the fuel injection valve 4a closes to terminate fuel injection.

The ANG register 21 in the fuel injection start timing control section 24 updates the set fuel injection start timing data at every occurence of the crank reference signal $\theta_{ref}$.

With this arrangement, fuel injection starts at the timing set in the ANG register 231 and is maintained for a period as set in the EGI register 25a. By this, the fuel injection amount can be controlled by adjusting the fuel injection pulse width.

Control operation to be taken place by the preferred embodiment of the fuel injection control system as set forth above will be discussed in detail with reference to FIGS. 4 to 10.

Figures 4A, 4B:
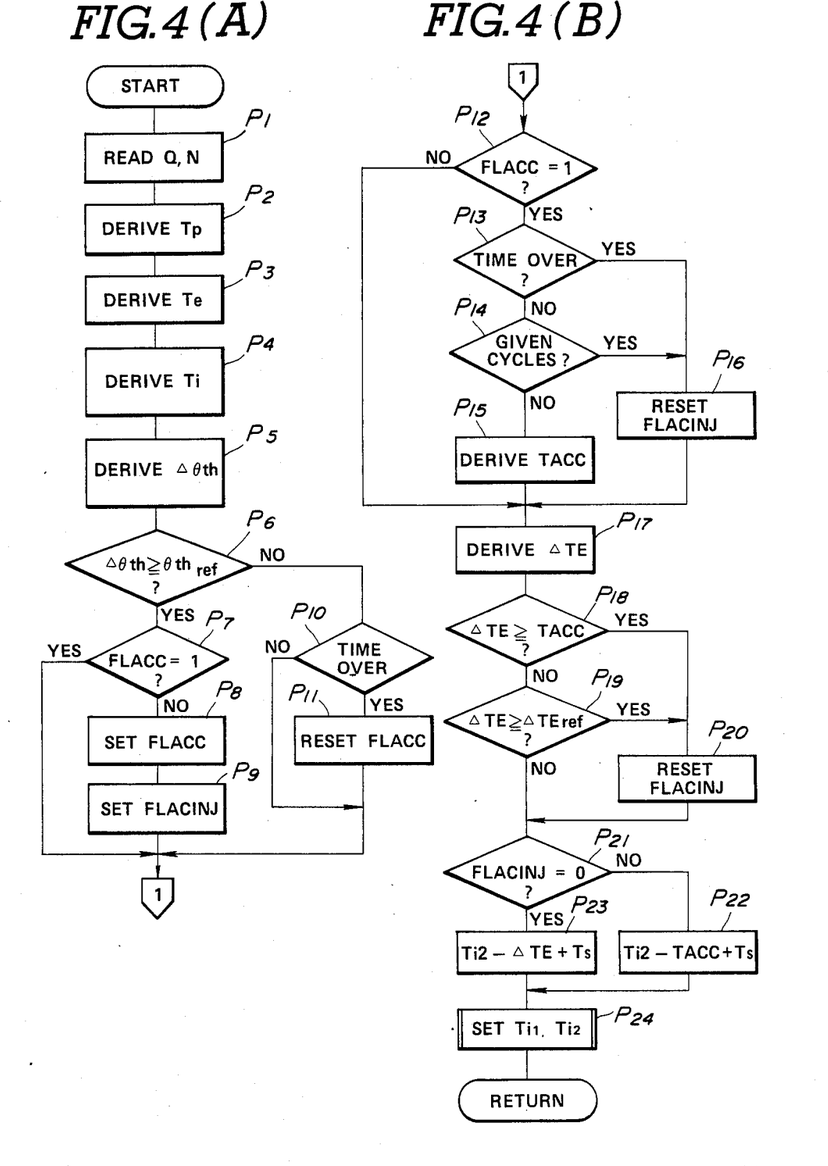
FIGS. 4(A) and 4(B) are flowchart of a sequence of a fuel injection amount derivation routine as an interrupt routine.
Figures 5, 6, 7:
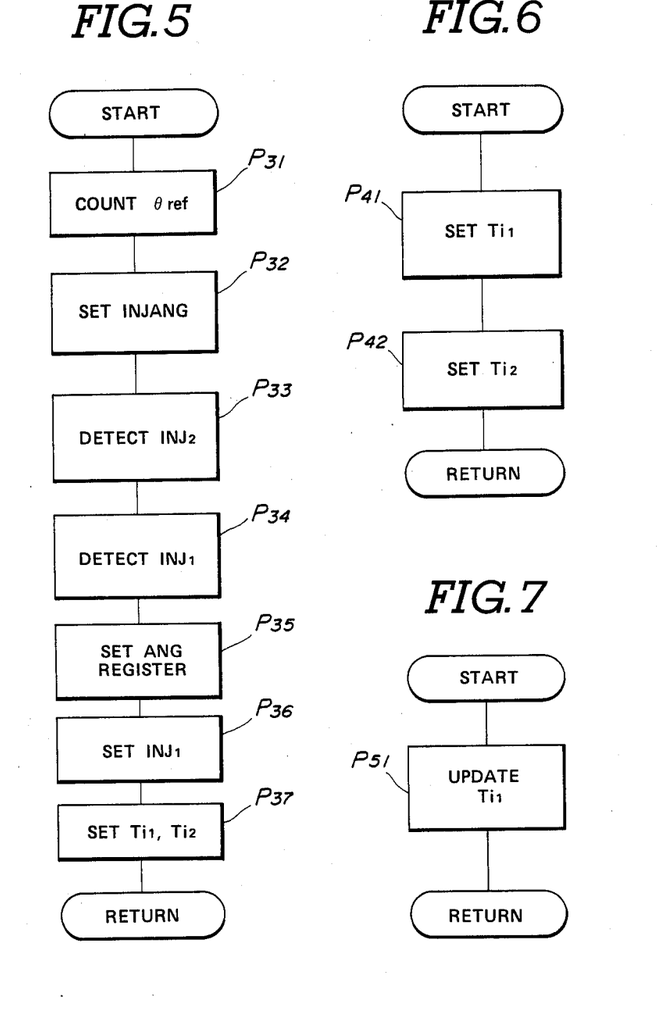
FIG. 5 is a flowchart of a fuel injection timing derivation routine as an interrupt routine.
FIG. 6 is a flowchart of a fuel injection pulse width setting routine as an interrupt routine.
FIG. 7 is a flowchart of a fuel injection pulse width recording routine.
Figure 8:
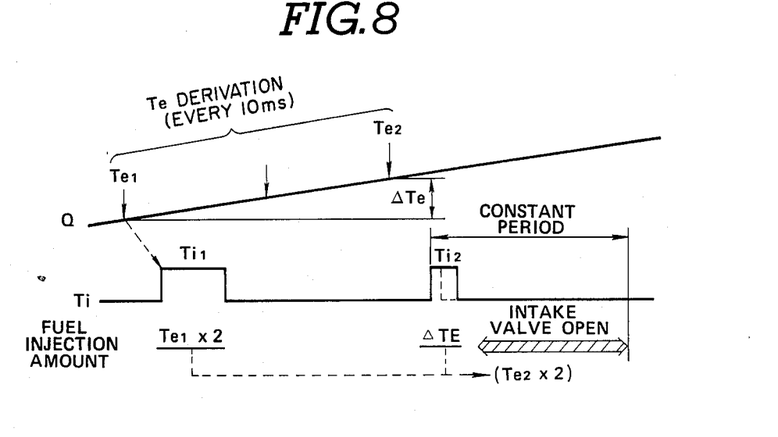
FIG. 8 is a chart showing first and second fuel injection timings in relation to engine revolution cycle.

Before discussing detail about fuel injection control operation to be performed by the preferred embodiment of the fuel injection control system, it should be noted that fuel injection control is performed by a microprocessor which serves as the control unit and performs various control operations, such as a spark ignition control, exhaust gas recirculation rate (EGR) control, air/fuel mixture ratio control ($\lambda$ control) and so forth. Various control operations are governed by a main program executed as a background job. Therefore, the routines illustrated in FIGS. 4 to 8 are executed as interrupt routines at respectively predetermined timings. Namely, the routine of FIGS. 4(A) and 4(B) is triggered every 10 ms for deriving fuel injection amount on the basis of the fuel injection control parameters, such as the intake air flow rate Q, the engine speed N, throttle valve angular position $\theta_{th}$ and so forth. The routine of FIG. 5 is triggered every occurence of the crank reference signal $\theta_{ref}$ for deriving fuel injection timing date, i.e. fuel injection start timing data and fuel injection pulse width data. The routine of FIG. 6 is a sub-routine to be triggered during execution of the routine of FIGS. 4 and 5. The routine of FIG. 7 is triggered at the same timing of updating of the EGI register.

In the routine of FIGS. 4(A) and 4(B), the air flow rate signal value Q which is representative of the engine load, and the engine speed data N are read, at a step P1. Based on the air flow rate signal value Q and the engine speed data N, a basic fuel injection amount Tp is derived at a step P2. As is well known, the basic fuel injection amount Tp is calculated by:

$$Tp = K \times Q/N \tag{1}$$

where K: constant

The basic fuel injection amount Tp is modified by a correction value derived on the basis of correction parameters, such as engine coolant temperature Tw and so forth, to obtain a modified fuel injection amount Te, at a step P3.

It should be noted that the basic fuel injection amount Tp derived in the step P2 and the modified fuel injection amount Te are the amount of fuel received for one turn of crank shaft, which one turn of crank shaft will be hereafter referred to as 'engine cycle'. Since one engine revolution cycle is two engine cycles, the amount of fuel required for one engine revolution cycle is twice of the modified fuel injection amount Te. Therefore, the fuel injection pulse width Ti is derived by:

$$Ti = Te \times 2 + Ts \qquad (2)$$

where Ts: battery voltage dependent correction value

The battery voltage dependent correction of the modified fuel injection correction value Te is necessary for compensating fluctuation of time lag of the fuel injection value caused by fluctuation of the battery voltage. Therefore, in fact, the amount of fuel to be injected corresponds to twice of the modified fuel injection amount Te in the fuel injection pulse width Ti.

At a step P5, the throttle angle signal value $\theta_{th}$ is read. Read throttle angle signal value $\theta_{th}$ is registered in a temporary register and compared with older throttle angle signal value registered during immediately preceding execution cycle to derive a throttle angle variation indicative difference value $\Delta\theta_{th}$. The difference value $\Delta\theta_{th}$ derived at the step P5, is compared with an engine acceleration threshold $\theta th_{ref}$, at a step P6. The engine acceleration threshold $\theta th_{ref}$ is determined as a criterion for detecting engine acceleration demand. Namely, when the difference value $\Delta\theta_{th}$ as derived at the step P5, is greater than or equal to the engine acceleration threshold $\theta th_{ref}$ as checked at the step P6, judgement is made that engine acceleration is required and thus acceleration enrichment is required. On the other hand, if the difference value $\Delta\theta_{th}$ is smaller than the engine acceleration threshold $\theta th_{ref}$, judgement is made that no acceleration demand is exist.

Figure 10:
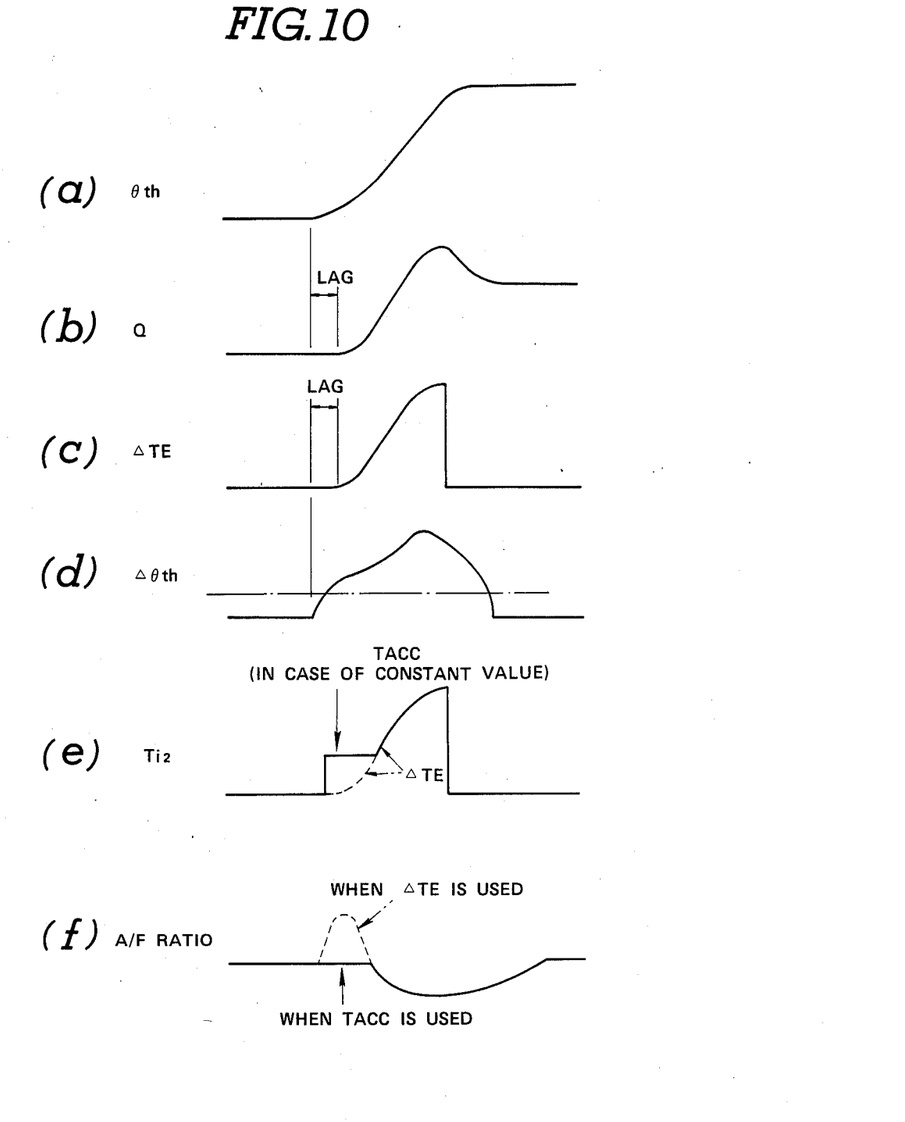
FIG. 10, comprising graphs 10A through 10F is a chart showing operation of acceleration enrichment to be performed by the preferred embodiment of the fuel injection control system of the present invention.

At the initial stage of engine acceleration, air flow rate as monitored by the air flow meter 6, lags as shown in FIG. 10(b). Therefore, when the fuel injection amount is derived on the basis of the air flow rate signal of the air flow meter, the amount of fuel to be injected at the initial stage of the engine acceleration becomes smaller than that required due to lag of response of the air flow meter as shown in FIG. 10(c). As a result, the air/fuel ratio becomes lean. Such lean mixture tends to degrade engine acceleration characteristics. In the worst case, lean mixture causes mis-firing. Air/fuel mixture will become leaner when the inner peripheral wall of the intake manifold is in dry condition. In order to avoid such defect, the shown embodiment of the fuel injection control system takes the throttle angle data for detecting a demand for acceleration enrichment. As seen from FIGS. 10(a) an 10(d), the throttle angle as monitored by the throttle angle sensor linearly varies according to variation of engine load. As being clearly appreciated from FIG. 10(d), detection of the engine acceleration demand by the throttle angle variation is quicker in responding to increase of the engine load and thus provide much better engine acceleration characteristics.

When the difference value $\Delta\theta_{th}$ is greater than or equal to the engine acceleration threshold $\theta th_{ref}$ as checked at the step P6, an acceleration demand indicative flag FLACC is checked at a step P7. If the acceleration demand indicative flag FLACC is not set at the step P7, the acceleration demand indicative flag FLACC is set at a step P8. In addition, an acceleration enrichment indicative flag FLACINJ is set at a step P9.

On the other hand, when the difference value $\Delta\theta_{th}$ is smaller than the engine acceleration threshold $\theta th_{ref}$, an elapsed time in which the difference value $\Delta\theta_{th}$ is maintained smaller than the engine acceleration threshold $\theta th_{ref}$, is measured. At a step P10, the measured elapsed time is compared with a time threshold to check time-over. When the elapsed time as checked at the step P10 is longer than or equal to the time threshold, the acceleration demand indicative flag FLACC is reset at a step P11.

The step P10 is provided for preventing the acceleration enrichment control from causing hunting due to fluctuation of the engine load.

When the acceleration demand indicative flag FLACC is already checked at the step P7, when the elapsed time is shorter than the time threshold, or after the step P9 or P11, process goes to a step P12. At the step P12, the acceleration demand indicative flag FLACC is checked again. When the acceleration demand indicative flag FLACC is set as checked at the step P12, an elapsed time after setting the acceleration demand indicative flag is checked whether predetermined period of time expires from starting of acceleration enrichment, at a step P13. If the elapsed time is shorter than the predetermined period of time, number of engine cycles after acceleration enrichment is checked at a step P14, whether acceleration enrichment is performed over a given number of engine cycles.

When the number of engine cycle over which acceleration enrichment is performed in smaller than the given number, acceleration enrichment fuel injection amount TACC is determined at a step P15. The acceleration enrichment fuel injection amount TACC can be determined either by setting a predetermined value or by deriving a value variable depending upon the difference value $\theta\Delta_{th}$.

On the other hand, when the predetermined time expires as checked at the step P13 or when the given number of engine cycles of acceleration enrichment is already performed, the acceleration enrichment indicative flag FLACINJ is reset at a step P16.

When the acceleration demand indicative flag FLACC is not set as checked at the step P12, or after the process at the step P15 or P16, a fuel injection compensating value $\Delta TE$ is derived at a step P17. The fuel injection compensating value $\Delta TE$ can be calculated by subtracting the fuel injection pulse width $Ti_1$ set for the primary injection from the fuel injection pulse width derived on the basis of the current fuel injection control parameter. Namely, the fuel injection compensating value $\Delta TE$ can be calculated by:

$$\Delta TE = Ti - Ti_1 \qquad (3)$$

The fuel injection compensating value $\Delta TE$ derived at the step P17 as set forth above, is compared with the acceleration enrichment fuel injection value TACC, at a step P18. When the fuel injection compensating value $\Delta TE$ is greater than or equal to the acceleration enrichment fuel injection value TACC, process goes to a step P20 to reset the acceleration enrichment indicative flag FLACINJ. On the other hand, when the fuel injection compensating value $\Delta TE$ is smaller than the acceleration enrichment fuel injection value TACC, the fuel injection compensating value $\Delta TE$ is compared with a given threshold value $\Delta TE_{ref}$ at a step P19. If the fuel injection compensating value ΔTE is greater than or equal to the threshold value ΔTE$_{ref}$, the process also goes to the step P20 to reset the acceleration enrichment indicative flag FLACINJ.

On the other hand, when the fuel injection compensating value ΔTe is smaller than the threshold value ΔTE$_{ref}$ as checked at the step P19, or after the step P20, the acceleration enrichment indicative flag FLACINJ is checked at a step P21. When the acceleration enrichment indicative flag FLACINJ is not set as checked at the step P21, a sum of the fuel injection compensating value ΔTE and the battery voltage dependent correction value Ts is set as fuel injection pulse width Ti$_2$ for the auxiliary injection. On the other hand, when the acceleration enrichment indicative flag FLACING is set as checked at the step P21, a sum of the acceleration enrichment fuel injection value TACC and the battery voltage dependent correction value Ts is set as the fuel injection pulse width Ti$_2$ for the auxiliary injection, at a step P22.

After setting the auxiliary fuel injection pulse width Ti$_2$ either at the step P23 or the step P22, process goes to a step 24, in which the sub-routine of FIG. 6 is triggered to set the primary and auxiliary fuel injection pulse widths Ti$_1$ and Ti$_2$ in the fuel injection pulse generators corresponding to the engine cylinders for which the primary and auxiliary injection is to be performed. Detail of the fuel injection setting sub-routine will be discussed later with reference to FIG. 6.

As will be seen herefrom, by the steps P13, P14, P18 and P19, the engine driving condition requiring acceleration enrichment is distinguished so that the acceleration enrichment fuel injection value TACC will be used for deriving the auxiliary fuel injection pulse width Ti$_2$ and otherwise, the fuel injection compensating value ΔTE which is variable depending upon the difference of the successively derived fuel injection pulse widths. This prevents the air/fuel mixture from becoming too rich after the air flow meter recovers its lag.

It should be further appreciated that, since the shown embodiment of the fuel injection system is designed for injecting the controlled amount of fuel for reach cylinder at independent timing to that for other cylinders. Therefore, the primary and auxiliary fuel injection pulse width set about each fuel injection valve should be differentiated since the fuel injection pulse width derivation timing is different. Therefore, though it is not clearly shown on the drawings, the control unit 10 may have a temporary register for strong the primary and auxiliary fuel injection pulse width Ti$_1$ and Ti$_2$ for each cylinder. In order to store the fuel injection pulse width data in the corresponding memory block in the temporary register, an address signal may be supplied for controlling access of the memory blocks of the temporary register by CPU. The address signal may be produced in synchronism with the engine revolution cycle as represented by the crank reference signal.

FIG. 5 shows a routine to be triggered every occurence of the crank reference signal θ$_{ref}$. At a step P31, a crank reference signal counter (not shown) in the control unit 10 is incremented by 1. The crank reference signal counter is designed to be reset every end or beginning of the engine revolution cycle. In practice, the crank reference signal to be produced at 70° BTDC in compression stroke of one of the engine cylinder, such as No. 1 cylinder, will have different pulse width than that of others. Therefore, the crank reference signal counter may be reset in response to such crank reference signal having pulse width different from that of others.

The crank reference signal counter value as incremented at the step P31 serves as a data identifying the engine cylinder approaching the induction stroke TDC. Based on the crank reference signal counter value, one of the engine cylinder which is in the induction stroke is identified. At a step P32, an auxiliary fuel injection start timing INJANG for the engine cylinder in the induction stroke is determined. The auxiliary fuel injection start timing is so determined as to complete the auxiliary fuel injection before the intake valve corresponding to the engine cylinder in the induction passage, is fully closed. In practice, the auxiliary fuel injection start timing is so determined in view of the auxiliary fuel injection pulse width that a given period of time is left from termination of the auxiliary fuel injection to closure of the intake valve. This given period of time is set to be equal to or preferably slightly longer than possible period required for introducing all of the injected air/fuel mixture is introduced into the engine combustion chamber.

In the practical embodiment, the auxiliary fuel injection start timing data INJANG is a 2 digit data. The first and upper digit of the auxiliary fuel injection start timing data INJANG is adapted to be incremented the value every 120°. Namely, the first and upper digit of the auxiliary fuel injection start timing data INJANG will have a value corresponding the crank reference signal counter value and thus identifies cylinder number to perform auxiliary fuel injection. On the other hand, the second and lower digit of the auxiliary fuel injection start timing data INJANG has a value representative of the angular value to be set in the ANG register 21 of the fuel injection start timing control section 24 of the input/output unit 20.

Figure 9:
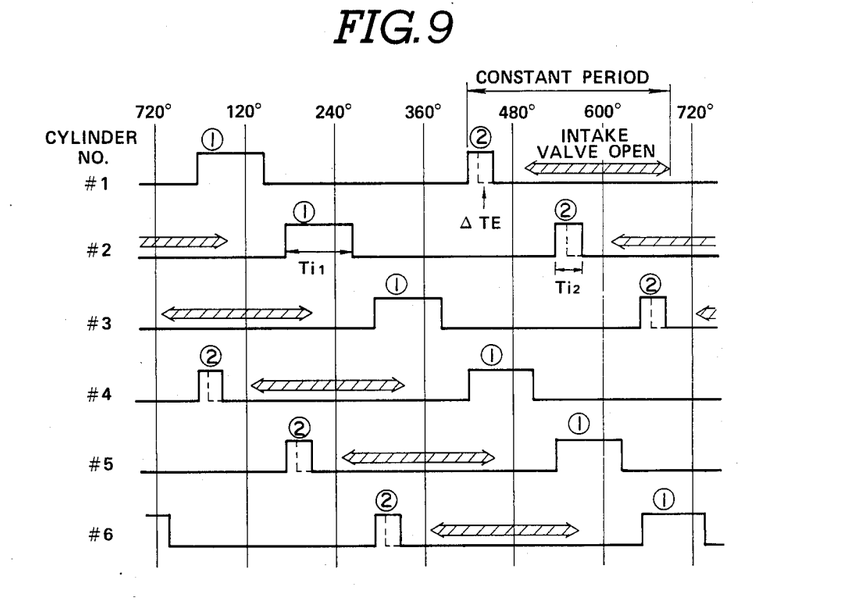
FIG. 9 is a timing chart showing operation of the preferred embodiment of the fuel injection control system of the invention.

At a step P33, the engine cylinder number to perform auxiliary fuel injection is identified based on the first digit data of the auxiliary fuel injection start timing data INJANG. Based on the cylinder identified on the basis of the first digit data of the auxiliary fuel injection start timing data INJANG, an auxiliary fuel injecting cylinder identification data INJ$_2$ is set in a temporary register (not shown) in the control unit. At a step P34, the engine cylinder number to perform the primary fuel injection is identified. Based on the cylinder identified, a primary fuel injecting cylinder identification data INJ$_1$ is set in a temporary register (not shown) in the control unit, at the step P34. In the shown embodiment, the engine cylinder to start primary fuel injection at the same timing to the auxiliary fuel injection start timing set in the ANG register is three next cylinder. Namely, assuming the order of engine cylinder to take place spark ignition is No. 1 - No. 2 - No. 3 - No. 4 - No. 5 - No. 6, the primary fuel injection for the No. 1 cylinder is taken place at the timing of auxiliary fuel injection for the No. 4 cylinder, as shown in FIG. 9.

It should be noted that though the shown embodiment is designed to start the primary and auxiliary fuel injection for different engine cylinder at the same timing, it may be possible to set the timing of the primary fuel injection independently of the auxiliary fuel injection timing of the corresponding, three next engine cylinder.

After the step P34, the second digit data of the auxiliary fuel injection start timing data INJANG is set in the ANG register 21, at a step P35. At a step P36, the HIGH level gate signal G is output from the CPU to the AND gate corresponding to the engine cylinders identified by the primary and auxiliary fuel injecting cylinder identification data INJ$_1$ and INJ$_2$ set through the steps P33 and P34, at a step P36. Therefore, AND gate corresponding to the engine cylinders to perform the primary and auxiliary fuel injection become ready for performing furl injection in response to the HIGH level comparator signal from the comparator 23 of the fuel injection start timing control section 24. Then, primary and auxiliary fuel injection pulse width Ti$_1$ and Ti$_2$ are set in respectively corresponding EGI register 25a, 25b, 25c, 25d, 25e and 25f as identified by the gate signal G, at a step P37. In practice, at the step P37, the sub-routine of FIG. 6 is triggered for setting the primary and auxiliary fuel injection pulse width Ti$_1$ and Ti$_2$.

After the process at the step P37, process returns to the background job.

FIG. 6 shows the sub-routine for setting the primary and auxiliary fuel injection pulse width Ti$_1$ and Ti$_2$. As set forth above, the shown sub-routine is triggered by the step P24 and P37 of the routines of FIGS. 4 and 5.

At a step P41, the primary fuel injection pulse width Ti$_1$ is set in the EGI register corresponding to the engine cylinder identified by the primary fuel injecting cylinder identification data INJ$_1$. At a step P41, the auxiliary fuel injection pulse width Ti$_2$ is set in the EGI register corresponding to the engine cylinder identified by the auxiliary fuel injecting cylinder identification data INJ$_2$. After the process at the step P42, the process returns to the background job.

The routine of FIG. 7 is triggered everytime of setting of the primary fuel injection pulse width Ti$_1$ to the EGI register to store the primary fuel injection pulse width data Ti$_1$ in an appropriate memory address of RAM, at a step P51. The primary fuel injection pulse width data stored in RAM is used for derivation of the auxiliary fuel injection pulse width, as discussed with respect to the step P17 of the routine of FIG. 4(B).

As will be appreciated herefrom in the shown embodiment, the primary fuel injection pulse width is determined to correspond to twice of the modified fuel injection amount and the auxiliary fuel injection pulse width is determined to correspond to twice of the fuel injection compensating value $\Delta$TE. Therefore, the total fuel injection amount Te$_{total}$ for one cylinder becomes:

$$Te_{total} = 2Te + 2\Delta TE$$

This total fuel injection amount Te$_{total}$ may precisely corresponds to the fuel injection amount to be derived at the timing of derivation of the fuel injection compensating value $\Delta$TE on the basis of the current engine speed N and the current engine load Q and correction factors.

Therefore, since the primary fuel injection, by which substantial part of the fuel to be injected is injected, can be sufficiently advanced in relation to the corresponding intake valve open timing so that good fuel atomization characteristics can be obtained. On the other hand, additional fuel amount required by increasing of the engine load can be compensated by the auxiliary fuel injection which is taken place sufficiently later timing than that of the primary fuel injection to maintain the total amount of fuel to be supplied to the engine cylinder is precisely correspond to the engine load.

With the shown arrangement, the fuel injection control system according to the present invention provides substantially improved engine performance and acceleration characteristics. Therefore, the invention fulfills all of the objects and advantages sought therefor.

What is claimed is:

1. A fuel injection control system for an internal combustion engine comprising:
    a plurality of fuel injection valves for injecting fuel to respectively engine cylinders;
    a first sensor means for monitoring engine load to produce a first sensor signal indicative thereof;
    a second sensor means for monitoring crank shaft angular position for producing a second sensor signal;
    a third means for monitoring engine speed to produce an engine speed indicative data; and
    a control unit for controlling operation of each of said fuel injection valves to perform controlled amount of fuel injection at first and second injection timings in one engine revolution cycle, said first injection timing being set at advanced timing to that of said second injection timing, said control unit performing two cycles of data processing operations at first derivation timing for deriving first fuel injection pulse width for fuel injection at said first injection timing, based in said first sensor signal value and said engine speed indicative data obtained at said first derivation timing and at a second derivation timing for deriving second fuel injection pulse width for fuel injection at said second derivation timing, which second fuel injection pulse width is variable depending upon variation of engine load between said first and second derivation timings for compensating fuel amount required by increase of the engine load during the period between said first and second derivation timings.

2. A fuel injection control system as set forth in claim 1, wherein said control unit derives fuel injection amount required for one engine cycle based on said first sensor signal value and said engine speed indicative data for setting said first fuel injection pulse width corresponding to twice of said fuel injection amount and derives a fuel compensating amount based on the engine load variation between said first and second derivation timings for setting said second fuel injection pulse width corresponding to twice of said fuel compensating amount.

3. A fuel injection control system as set forth in claim 2, wherein said control unit derives fuel injection amount at said second derivation timing, compares said fuel injection amount derived at said second fuel derivation timing with the fuel injection amount derived at said first derivation timing for obtaining a difference which serves as said fuel compensating amount.

4. A fuel injection control system as set forth in claim 1, wherein said control unit set said first fuel injection timing for one engine cylinder to overlap with second fuel injection timing of another engine cylinder.

5. A fuel injection control system as set forth in claim 4, wherein said control unit derives fuel injection amount required for one engine cycle based on said first sensor signal value and said engine speed indicative data for setting said first fuel injection pulse width corresponding to twice of said fuel injection amount and derives a fuel compensating amount based on the engine load variation between said first and second derivation timings for setting said second fuel injection pulse width corresponding to twice of said fuel compensating amount.

6. A fuel injection control system as set forth in claim 5, wherein said control unit derives fuel injection amount at said second derivation timing, compares said fuel injection amount derived at said second fuel derivation timing with the fuel injection amount derived at said first derivation timing for obtaining a difference which serves as said fuel compensating amount.

7. A fuel injection control system as set forth in claim 4, wherein said control unit derives said first fuel injection pulse width for one engine cylinder at said first derivation timing and said second fuel injection pulse for said one of engine cylinder at said second derivation timing which overlaps with the first derivation timing for deriving said first fuel injection pulse width for another engine cylinder.

8. A fuel injection control system as set forth in claim 1, which further comprises a fourth means for monitoring variation of the engine load to detect engine acceleration demand for producing an acceleration demand indicative data and said control unit is responsive to said acceleration demand indicative data for deriving an acceleration enrichment fuel injection pulse width at said second derivation timing in place of said second fuel injection pulse width.

9. A fuel injection control system as set forth in claim 8, wherein said control unit maintains said acceleration enrichment fuel injection pulse width for a given number of occurences of second fuel injection.

10. A fuel injection control system as set forth in claim 8, wherein said fourth means monitors throttle valve angular position for determining a throttle angle variation rate greater than a given value for producing said acceleration demand indicative data.

11. A fuel injection control system as set forth in claim 1, wherein said control unit determines said first and second injection timings and said first and second derivation timings on the basis of said second sensor signal and in synchronism with engine revolution cycle.

12. A fuel injection control system as set forth in claim 11, wherein said control unit derives fuel injection amount required for one engine cycle based on said first sensor signal value and said engine speed indicative data for setting said first fuel injection pulse width corresponding to twice of said fuel injection amount and derives a fuel compensating amount based on the engine load variation between said first and second derivation timings for setting said second fuel injection pulse width corresponding to twice of said fuel compensating amount.

13. A fuel injection control system as set forth in claim 12, wherein said control unit derives fuel injection amount at said second derivation timing, compares said fuel injection amount derived at said second fuel derivation timing with the fuel injection amount derived at said first derivation timing for obtaining a difference which serves as said fuel compensating amount.

14. A fuel injection control system as set forth in claim 13, wherein said control unit set said first fuel injection timing for one engine cylinder to overlap with second fuel injection timing of another engine cylinder.

15. A fuel injection control system as set forth in claim 14, wherein said control unit derives said first fuel injection pulse width for one engine cylinder at said first derivation timing and said second fuel injection pulse for said one of engine cylinder at said second derivation timing which overlaps with the first derivation timing for deriving said first fuel injection pulse width for another engine cylinder.

16. A fuel injection control system as set forth in claim 15, which further comprises a fourth means for monitoring variation of the engine load to detect engine acceleration demand for producing an acceleration demand indicative data and said control unit is responsive to said acceleration demand indicative data for deriving an acceleration enrichment fuel injection pulse width at said second derivation timing in place of said second fuel injection pulse width.

17. A fuel injection control system and set forth in claim 16, wherein said control unit maintains said acceleration enrichment fuel injection pulse width for a given number of occurences of second fuel injection.

18. A fuel injection control system as set forth in claim 17, wherein said fourth means monitors throttle valve angular position for determining a throttle angle variation rate greater than a given value for producing said acceleration demand indicative data.

19. A fuel injection control system for an internal combustion engine comprising:
   a plurality of fuel injection valves for injecting fuel to respectively engine cylinders;
   a first sensor means for monitoring engine load to produce a first sensor signal indicative thereof;
   a second sensor means for monitoring crank shaft angular position for producing a second sensor signal;
   a third means for monitoring engine speed to produce an engine speed indicative data;
   a fourth means for monitoring variation of the engine load to detect engine acceleration demand for producing an acceleration demand indicative data; and
   a control unit for controlling operation of each of said fuel injection valves to perform controlled amount of fuel injection at first and second injection timings in one engine revolution cycle, said first injection timing being set at advanced timing to that of said second injection timing, said control unit performing two cycles of data processing operations at first derivation timing for deriving first fuel injection pulse width for fuel injection at said first injection timing, based in said first sensor signal value and said engine speed indicative data obtained at said first derivation timing and at a second derivation timing for deriving second fuel injection pulse width for fuel injection at said second derivation timing, which second fuel injection pulse width is variable depending upon variation of engine load between said first and second derivation timings for compensating fuel amount required by increase of the engine load during the period between said first and second derivation timings, and said control unit being responsive to said acceleration demand indicative data for deriving an acceleration enrichment fuel injection pulse width at said second derivation timing in place of said second fuel injection pulse width.

20. A fuel injection control system as set forth in claim 19, wherein said control unit maintains said acceleration enrichment fuel injection pulse width for a given number of occurrences of second fuel injection.

21. A fuel injection control system as set forth in claim 20, wherein said fourth means monitors throttle valve angular position for determining a throttle angle variation rate greater than a given value for producing said acceleration demand indicative data.

22. A fuel injection control system as set forth in claim 21, wherein said control unit determines said first and second injection timings and said first and second derivation timings on the basis of said second sensor signal and in synchronism with engine revolution cycle.

23. A fuel injection control system as set forth in claim 22, wherein said control unit derives fuel injection amount required for one engine cycle based on said first sensor signal value and said engine speed indicative data for setting said first fuel injection pulse width corresponding to twice of said fuel injection amount and derives a fuel compensating amount based on the engine load variation between said first and second derivation timings for setting said second fuel injection pulse width corresponding to twice of said fuel compensating amount.

24. A fuel injection control system as set forth in claim 23, wherein said control unit derives fuel injection amount at said second derivation timing, compares said fuel injection amount derived at said second fuel derivation timing with the fuel injection amount derived at said first derivation timing for obtaining a difference which serves as said fuel compensating amount.

25. A fuel injection control system as set forth in claim 24, wherein said control unit set said first fuel injection timing for one engine cylinder to overlap with second fuel injection timing of another engine cylinder.

26. A fuel injection control system as set forth in claim 25, wherein said control unit derives said first fuel injection pulse width for one engine cylinder at said first derivation timing and said second fuel injection pulse for said one of engine cylinder at said second derivation timing which overlaps with the first derivation timing for deriving said first fuel injection pulse width for another engine cylinder.

* * * * *